(12) United States Patent
Seidl et al.

(10) Patent No.: US 7,249,225 B1
(45) Date of Patent: Jul. 24, 2007

(54) METHOD AND APPARATUS FOR SUPPORTING READ-ONLY OBJECTS WITHIN AN OBJECT-ADDRESSED MEMORY HIERARCHY

(75) Inventors: Matthew L. Seidl, Longmont, CO (US); Gregory M. Wright, Mountain View, CA (US); Mario I. Wolczko, San Carlos, CA (US)

(73) Assignee: Sun Microsystems, Inc, Santa Clara, CA (US)

( * ) Notice: Subject to any disclaimer, the term of this patent is extended or adjusted under 35 U.S.C. 154(b) by 375 days.

(21) Appl. No.: 10/698,727

(22) Filed: Oct. 31, 2003

(51) Int. Cl.
*G06F 12/14* (2006.01)
(52) U.S. Cl. .................... 711/145; 707/103 R; 711/221
(58) Field of Classification Search ...................... None
See application file for complete search history.

(56) References Cited

U.S. PATENT DOCUMENTS

| | | | | |
|---|---|---|---|---|
| 4,731,734 A | * | 3/1988 | Gruner et al. .............. | 711/202 |
| 5,649,139 A | * | 7/1997 | Weinreb et al. ............. | 711/202 |
| 6,324,634 B1 | * | 11/2001 | Yoshioka et al. ........... | 711/205 |
| 6,412,043 B1 | * | 6/2002 | Chopra et al. .............. | 711/118 |
| 6,801,994 B2 | * | 10/2004 | Beckert et al. ............. | 711/207 |

\* cited by examiner

*Primary Examiner*—Gary Portka
(74) *Attorney, Agent, or Firm*—Park, Vaughan & Fleming LLP

(57) ABSTRACT

One embodiment of the present invention provides a system that supports read-only objects within an object-addressed memory hierarchy. During operation, the system receives a request to access an object, wherein the request includes an object identifier for the object that is used to reference the object within the object-addressed memory hierarchy. In response to this request, the system uses the object identifier to retrieve an object table entry associated with the object. If the request is a write request, the system examines a read-only indicator within the object table entry. If this read-only indicator specifies that the object is a read-only object, the system performs a corrective action to deal with the fact that the write request is directed to a read-only object.

17 Claims, 5 Drawing Sheets

METHOD AND APPARATUS FOR SUPPORTING READ-ONLY OBJECTS WITHIN AN OBJECT-ADDRESSED MEMORY HIERARCHY

BACKGROUND

1. Field of the Invention

The present invention relates to the design of computer systems that support efficient references to objects defined within an object-oriented programming system. More specifically, the present invention relates to a method and an apparatus for supporting read-only objects within an object-addressed memory hierarchy.

2. Related Art

As object-oriented programming languages become more widely used, computer systems are being designed to manipulate objects more efficiently. In particular, some proposed object-addressed memory hierarchies include object-addressed caches that facilitate lookups based on location-independent object identifiers (OIDs) without having to first translate the OIDs into corresponding physical addresses. Furthermore, during cache miss operations, these object-addressed memory hierarchies also support translations between OIDs (used to access copies of objects in the object-addressed caches) and corresponding physical addresses (used to access copies of the objects in main memory).

Unfortunately, these proposed object-addressed memory hierarchies do not provide support for read-only copies of objects. This makes it hard to incorporate such object-addressed memory hierarchies into modern distributed object systems, which allow read-only copies of an object to reside on multiple hosts. Allowing read-only copies of an object to reside on multiple hosts provides significant performance advantages, because it enables each host to access a read-only copy of the object in its local cache, so long as the host only performs read operations on the object. Note that these local cache accesses can be orders of magnitude faster than non-local accesses.

Hence, what is needed is a method and an apparatus that supports a read-only copy of an object within a distributed object-addressed memory hierarchy.

SUMMARY

One embodiment of the present invention provides a system that supports read-only objects within an object-addressed memory hierarchy. During operation, the system receives a request to access an object, wherein the request includes an object identifier for the object that is used to reference the object within the object-addressed memory hierarchy. In response to this request, the system uses the object identifier to retrieve an object table entry associated with the object. If the request is a write request, the system examines a read-only indicator within the object table entry. If this read-only indicator specifies that the object is a read-only object, the system performs a corrective action to deal with the fact that the write request is directed to a read-only object.

In a variation on this embodiment, if the request is a read request, the system uses a physical address from the object table entry to access the object in main memory.

In a variation on this embodiment, performing the corrective action can involve causing a fault handler in the requesting processor to perform the corrective action.

In a variation on this embodiment, performing the corrective action can involve obtaining a writable copy of the object, clearing the read-only indicator to indicate that the object is no longer read-only, and updating the writable copy of the object with data from the write request. It can also involve updating a remotely located master copy of the object with data from the write request. The corrective action can alternatively involve terminating the requesting process because the write request is not allowed. Furthermore, if the request is directed to a debugging breakpoint (or watch point), the corrective action can involve pausing the requesting process at the debugging breakpoint and clearing the read-only indicator.

In a variation on this embodiment, the request to access the object is received at a translator that translates between object identifiers (used to reference objects in an object cache) and physical addresses (used to address objects in main memory).

In a further variation, prior to receiving the request at the translator, the request is initially directed to the object cache. If the request causes a hit in the object cache, the object is accessed in the object cache and the request is not sent to the translator. Otherwise, if the request causes a miss in the object cache, the request is sent to the translator.

In a variation on this embodiment, the system makes a given object read-only by setting a read-only indicator associated with the given object to indicate that the given object is read-only and then causing all object caches within a local cache-coherent domain to flush any modified cache lines for the given object out to main memory. In this way, subsequent upgrades of the given object from read-only status to writable or modified status in any caches in the local cache-coherent domain must go through a translator.

In a further variation, the system causes all object caches within the local cache-coherent domain to flush any modified cache lines for the given object out to main memory by executing read-with-intent-to-only-read (RWITOR) instructions on each cache line of the given object.

In a further variation, the system makes the given object read only in response to a request received from outside the local cache-coherent domain.

In a further variation, the translator includes hardware to translate between object identifiers and physical addresses.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Computer System

Figure 1:
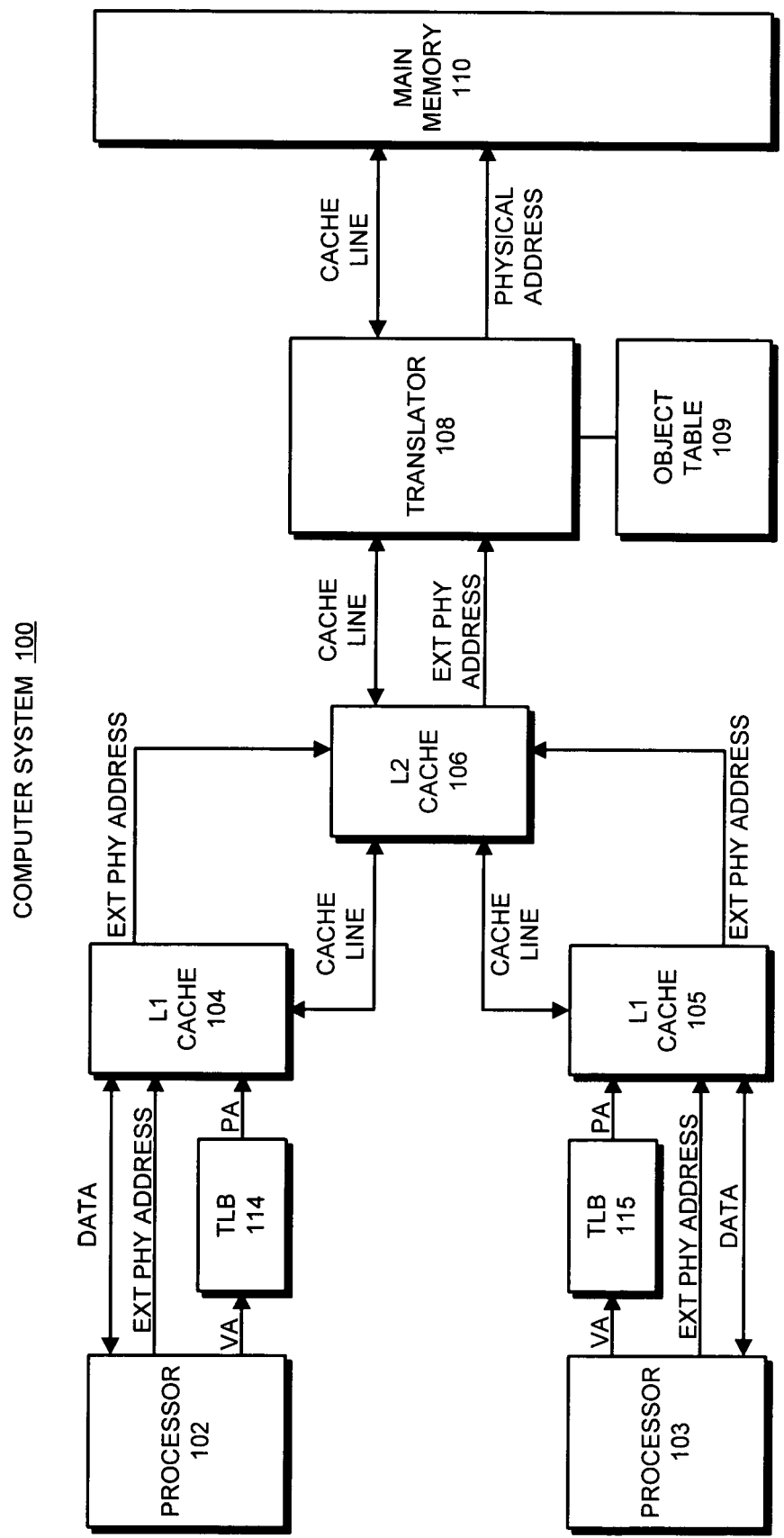
FIG. 1 illustrates a computer system in accordance with an embodiment of the present invention.

FIG. 1 illustrates a computer system 100 in accordance with an embodiment of the present invention. Computer system 100 can generally include any type of computer system, including, but not limited to, a computer system based on a microprocessor, a mainframe computer, a digital signal processor, a portable computing device, a personal organizer, a device controller, and a computational engine within an appliance.

As is illustrated in FIG. 1, computer system 100 includes processors 102 and 103. Processors 102 and 103 access code and data from L1 caches 104 and 105, respectively. Note that L1 caches 104 and 105 can include unified instruction/data caches, or alternatively, separate instruction caches and data caches.

Processors 102 and 103 are associated with translation lookaside buffers (TLBs) 114 and 115, which facilitate translating virtual addresses into physical addresses for non-object references.

L1 cache 104 and L1 cache 105 make use of an extended address encoding procedure that enables L1 cache 104 to function as both a conventional cache and an object cache. For example, during a conventional load operation, a virtual address is sent from processor 102 to TLB 114. TLB 114 translates the virtual address into a physical address, which is subsequently used by L1 cache 104.

In contrast, during a load operation involving a portion of an object, processor 102 obtains the corresponding object ID (OID) and offset and combines them to create an object address. This object address is embedded into an unused portion of the physical address space to produce an encoded address. Note that the higher order bits of this encoded address are typically different than the higher order bits of any physical address. This allows the system to distinguish an encoded address from a physical address. When the encoded address is subsequently sent from processor 102 to L1 cache 104, the encoded address bypasses TLB 114 and directly enters L1 cache 104. Note that only minor modifications are required to conventional cache designs in order to provide object caching using the above-described technique.

In order to request a non-object data item, such as a value from a normal virtual address, processor 102 generates a virtual address that is sent to TLB 114. TLB 114 translates this virtual address into a physical address, which is sent to L1 cache 104.

Note that after an object address is translated into an encoded address L1 cache 104, L1 cache 105 and L2 cache 106 can treat the encoded address in the same manner as a normal physical address.

If a given data item (or instruction) is not located within L1 cache 104 or L1 cache 105, it is retrieved from L2 cache 106. If it is not located within L2 cache 106, it is pulled into L2 cache 106 from main memory 110.

Unlike in a conventional memory hierarchy, a translator 108 is interposed between L2 cache 106 and main memory 110. Translator 108 converts an object address, comprising an object ID and an offset, into a corresponding physical address, which is sent to main memory 110.

If an object is not present within L2 cache 106, the encoded address is forwarded to translator 108. Translator 108 uses an object table 109 to translate the encoded address into a corresponding physical address. Each entry in object table 109 associates a given object ID with a corresponding physical address in main memory where the object resides. (Note that in one embodiment of the present invention, object table 109 is implemented as a table that resides in main memory 110.)

When a cache miss for an object occurs in L2 cache 106, translator 108 intercepts the encoded address and extracts the object ID. Next, translator 108 uses the object ID to index into the object table 109 for a corresponding physical address. Once the physical address is found, translator 108 converts the load request for the object into a load request for a physical address in main memory 110.

The system uses the physical address and the offset to locate a specific cache line (or cache lines) in main memory 10. Fetching circuitry within translator 108 issues a load request to main memory 110. This fetching circuitry subsequently receives the cache line corresponding to the physical address. The fetching circuitry then forwards the cache line to L2 cache 106.

Object cache lines differ from conventional physical cache lines because object cache lines can start on arbitrary word boundaries, whereas physical cache lines are delineated by larger power-of-two address boundaries. Hence, physical cache lines and object cache lines may not always align. For example, a physical cache line with a length of 64 bytes typically starts at a physical address that is a multiple of 64. Objects, however, may start on any physical address which is a multiple of four in a 32-bit system. Thus, a 64-byte object cache line starting at address 44 includes addresses (44 . . . 107). This overlaps with physical cache lines (0 . . . 63) and (64 . . . 127). In this case, the object is split across two physical cache lines. Hence, two memory read operations are required to retrieve the entire object cache line. Once both physical cache lines have been retrieved, the portions of the cache lines containing the object cache line, (44 . . . 63) and (64 . . . 107), are concatenated together to form the object cache line (44 . . . 107). Other portions of the physical cache lines are discarded.

In the event of an eviction from L2 cache 106, translator 108 converts the encoded address containing the object ID and the offset into a physical address. The fetching circuitry subsequently uses the physical address to generate a store operation to store the evicted cache line in main memory 110. Note that during the process of evicting an object line, the system may have to perform read-modify-write operations on two physical cache lines.

Note that processors 102 and 103 are configured to handle the extended address encoding procedure described above. In one embodiment of the present invention, a platform-independent virtual machine, such as a JAVA VIRTUAL MACHINE, is modified to generate requests for portions of an object using an object ID and an offset. Moreover, in one embodiment of the present invention, processors 102 and 103 are configured to execute special instructions for performing load and store operations involving an object ID and an offset—in addition to normal load and store instructions that use virtual addresses.

Although the present invention is described with reference to a computer system 100 with two levels of cache, the present invention can generally be used with any singlelevel or multi-level caching structure. Furthermore, although computer system 100 includes two processors, the present invention can generally be used with any number of processors.

Object Table Entry

Figure 2:
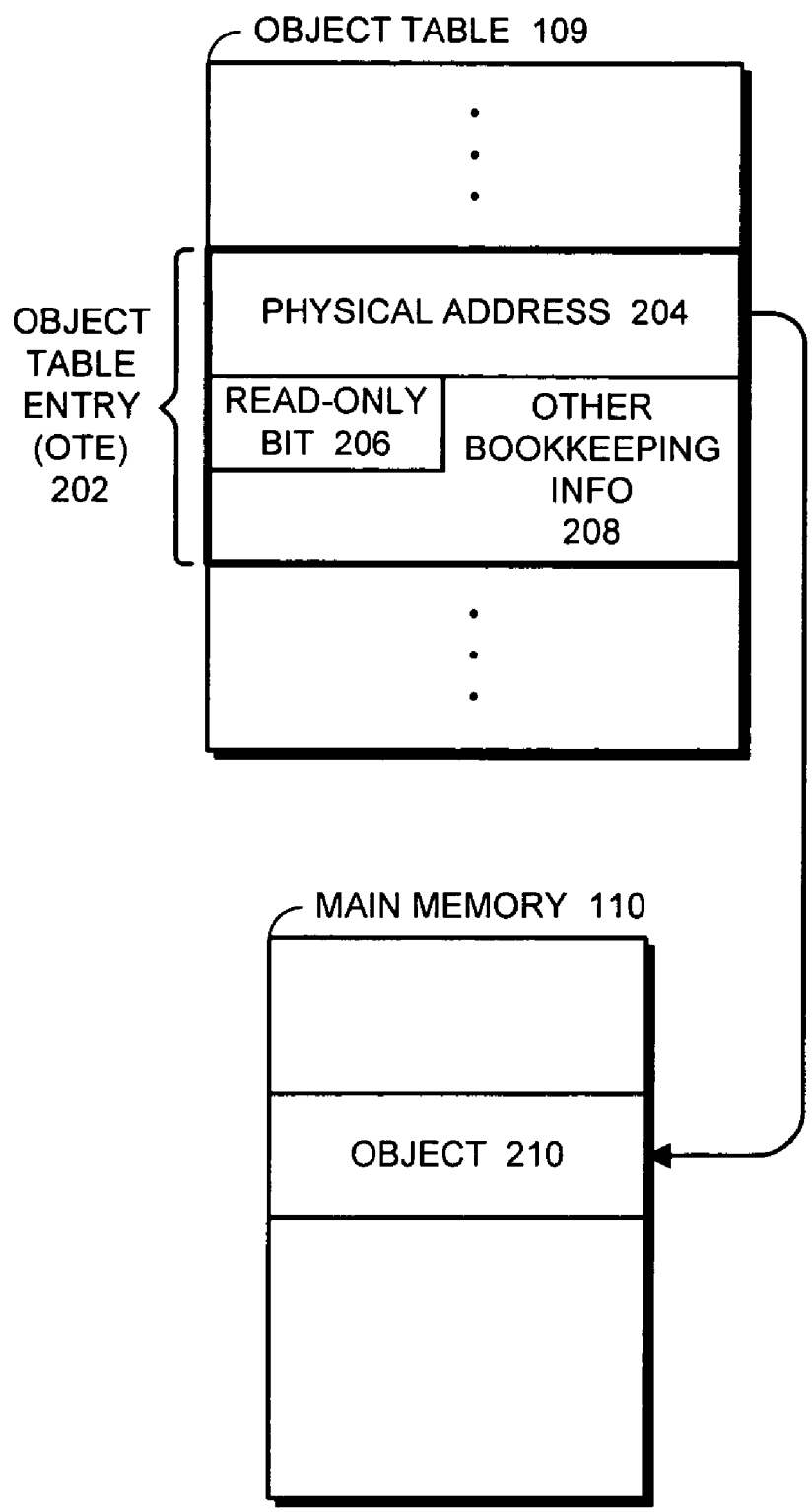
FIG. 2 illustrates an object table entry in accordance with an embodiment of the present invention.

FIG. 2 illustrates an object table entry 202 within object table 109 in accordance with an embodiment of the present invention. As is illustrated in FIG. 2, object table entry (OTE) 202 includes a number of items, such as a physical address 204, which specifies a location in main memory 110 for the corresponding object.

OTE additionally includes a read-only bit 206. If read-only bit 206 is set, all copies of the corresponding object in any object caches associated with translator 108 are read-only copies. On the other hand, if read-only bit 206 is clear, a copy of the object in an object cache associated with translator 108 may be an "owned" copy or a "modified" copy.

OTE 202 also contains other bookkeeping information 208, such as the size of the object, which can be used while manipulating the object.

Process of Accessing an Object

Figure 3:
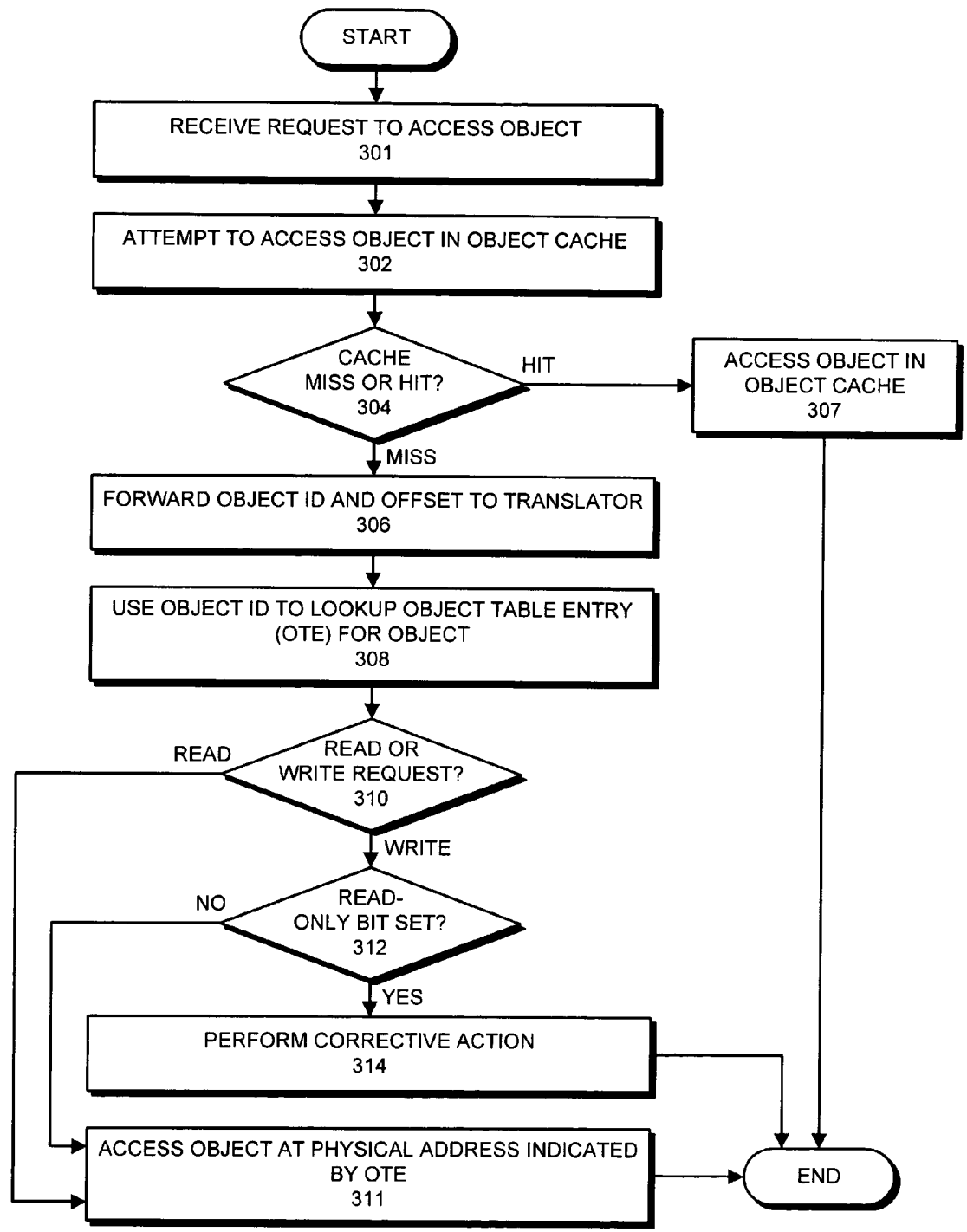
FIG. 3 presents a flow chart illustrating the process of using an object identifier to access an object in accordance with an embodiment of the present invention.

FIG. 3 presents a flow chart illustrating the process of accessing an object in accordance with an embodiment of the present invention. The system initially receives a request to access the object, wherein the request includes an object identifier (OID) that is used to reference the object in the object-addressed memory hierarchy (step 301). Next, the system uses the object identifier in an attempt to access the corresponding object in the object cache (step 302). This attempt either results in a cache hit or a cache miss (step 304).

In the case of a cache hit, the system accesses a copy of the object in the object cache (step 307). At this point, the request is satisfied.

Otherwise, in the case of a cache miss, the system forwards the object identifier and the corresponding object offset to translator 108 (see FIG. 1) (step 306). Translator 108 then uses the object identifier to lookup OTE 202 in object table 109 (step 308).

Next, the system determines if the request is a read request or a write request (step 310). If the request is a read request, the system uses the physical address 204 (and the object offset) to access the object in main memory 110 (step 311). At this point, the request is satisfied.

On the other hand, if the request is a write request, the system determines if read-only bit 206 in OTE 202 is set (step 312). If not, the system proceeds to step 311 to access the object in main memory 110, at which point the request is satisfied.

Otherwise, if read-only bit 206 is set, the system performs a corrective action to deal with the fact that a write request is directed to a read-only object (step 314). In one embodiment of the present invention, performing this corrective action involves causing a fault handler in the requesting processor to perform the corrective action.

Note that a number of corrective actions are possible. For example, the corrective action can involve obtaining a writable copy of the object, clearing the read-only bit to indicate that the object is no longer read-only, and then updating the writable copy of the object with data from the write request. It can also involve updating a remotely located master copy of the object with data from the write request. The corrective action can additionally involve terminating the requesting process because the write request is not allowed. In another example, if the request is directed to a debugging breakpoint, the corrective action can involve pausing the requesting process at the debugging breakpoint and clearing the read-only bit.

Process of Making an Object Read-Only

Figure 4:
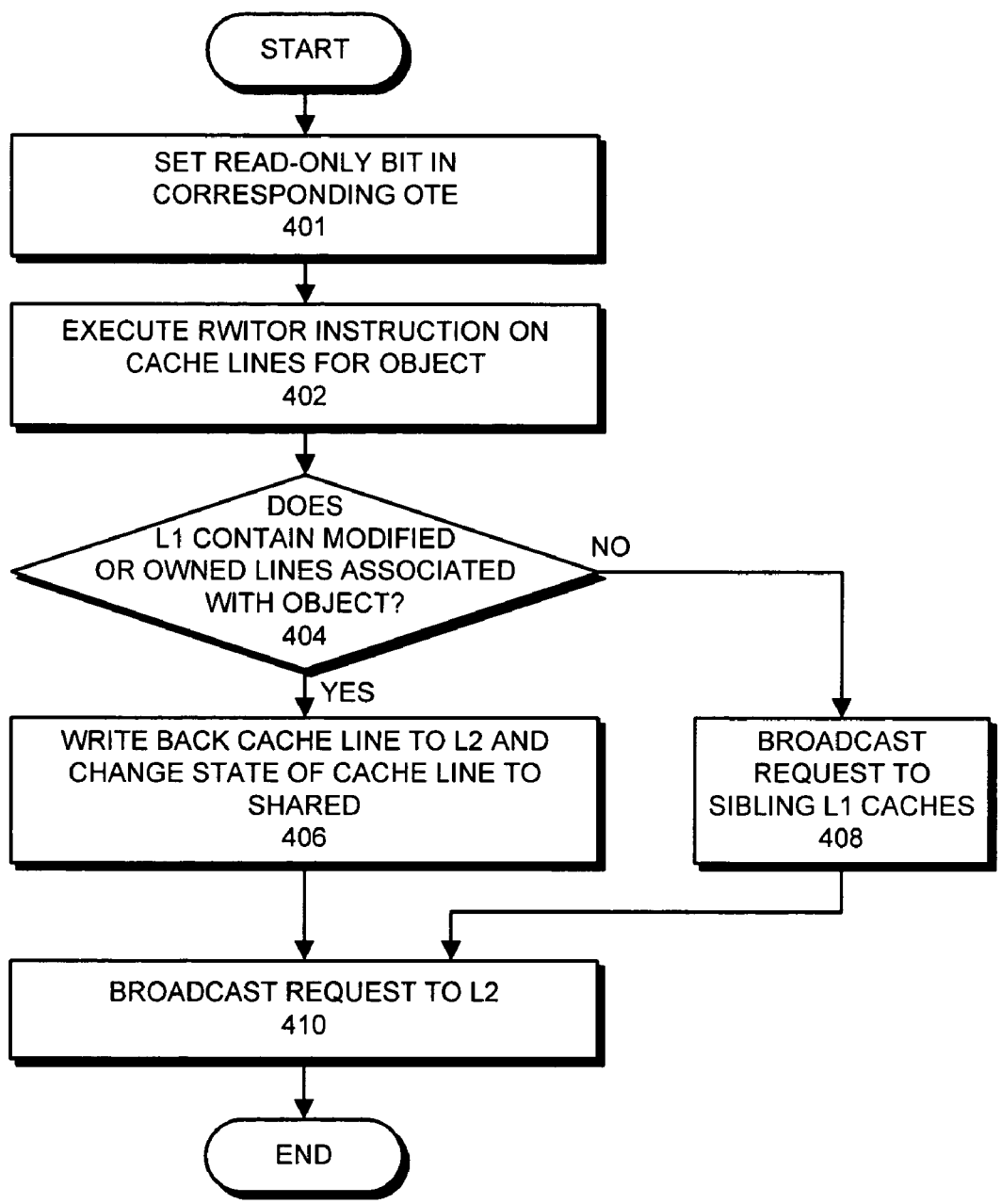
FIG. 4 presents a flow chart illustrating the process of executing a read-with-intent-to-only-read (RWITOR) instruction in accordance with an embodiment of the present invention.

FIG. 4 presents a flow chart illustrating the process of making an object read-only in accordance with an embodiment of the present invention. Referring to FIG. 1 and FIG. 4, in order to make an object read-only, the system first sets the read-only bit 206 of the corresponding object table entry 202 to indicate that the object is read-only (step 401). Next, the system executes a read-with-intent-to-only-read (RWITOR) instruction on each cache line of the object.

The RWITOR instruction can be thought of as a special cache flush instruction that causes any modified version of an object located in any cache in a local cache-coherent domain to be flushed out to main memory 110. When a processor 102 executes a RWITOR instruction on a cache line associated with an object (step 402), the system first determines if an L1 cache 104 associated with processor 102 contains modified or owned copies of the cache line associated with the object (step 404).

If so, the system writes any modified line back to L2 cache 106, and changes the state of the modified or owned line in L1 cache 104 to the shared state (step 406). Otherwise, if L1 cache 104 does not contain modified or owned lines associated with the object, the system broadcasts the RWITOR request to sibling L1 caches (such as L1 cache 105), which belong to the same local cache-coherent domain (step 408). This causes the sibling L1 caches to write modified lines back to L2 cache 106.

Note that in one embodiment of the present invention, the system either allows a single owned or modified copy of an object to exist in a single object cache associated with translator 108, or it allows multiple read-only (shared state) copies of the object to exist in multiple object caches associated with translator 108. This ensures that a read-only copy of the object must communicate with the translator to be upgraded to owned or modified state. This is because the read-only copy is not able to receive an upgrade directly from an owned or modified copy in another object cache associated with the translator 108.

Next, the system broadcasts the RWITOR request to L2 cache 106 (step 410). This causes L2 cache 106 to similarly flush any modified caches lines out to main memory 110.

In this way subsequent upgrades of the object from read-only status to writable or modified status in any caches associated with translator 108 must go through the translator 108.

Processing a Request from a Remote Processor

Figure 5:
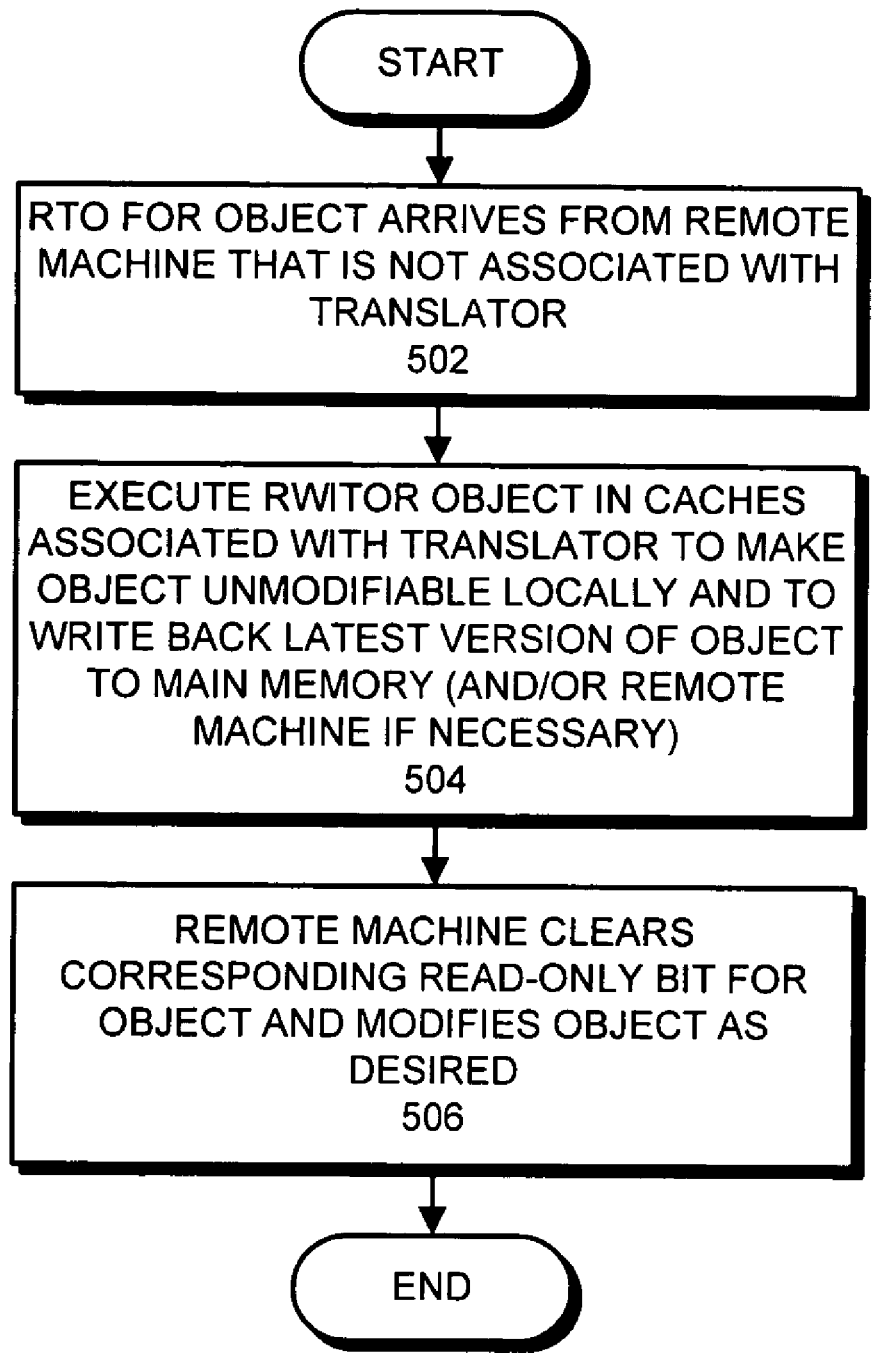
FIG. 5 presents a flow chart illustrating the processing of a foreign read-to-own (RTO) signal received from a remote machine in accordance with an embodiment of the present invention.

FIG. 5 presents a flow chart illustrating how the system handles a request to make an object read-only received from outside of a local cache-coherent domain in accordance with an embodiment of the present invention. The process starts when a request (for an object or a cache line associated with an object) is received from a remote machine that is located outside of the local cache-coherent domain (step 502).

In response to this request, the system makes the corresponding object read-only. The system does this by first setting the read-only bit 206 in the corresponding object table entry (OTE) 202 for the object to indicate that all copies of the object in object caches associated with translator 108 are read-only. Next, the system executes an RWITOR instruction on all cache lines associated with the object in all object caches within the local cache-coherent domain (step 504). This causes any modified cache lines associated with the object to be flushed out to main memory (and possibly forwarded to the processor that initiated the RTO operation).

Finally, the remote machine can obtain the latest modified version of the object (if necessary), can clear its corresponding read-only bit for the object, and can modify the object as desired (step 506).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for supporting read-only objects within an object-addressed memory hierarchy, comprising:
    receiving a request at a translator to access an object, wherein the request includes an object identifier for the object that is used to reference the object within the object-addressed memory hierarchy, and wherein the translator converts an object identifier and offset into a corresponding physical address and converts the request to access an object into a request for the corresponding physical address;
    using the object identifier to retrieve an object table entry associated with the object; and
    if the request is a write request,
        examining a read-only indicator within the object table entry, and
        if the read-only indicator specifies that the object is a read-only object, performing a corrective action to deal with the fact that the write request is directed to a read-only object, wherein performing the corrective action involves:
            obtaining a writable copy of the object, clearing the read-only indicator to indicate that the object is no longer read-only, and updating the writable copy of the object with data from the write request;
            updating a remotely located master copy of the object with data from the write request;
            terminating the requesting process because the write request is not allowed; and
            if the request is directed to a debugging breakpoint, pausing the requesting process and clearing the read-only indicator.

2. The method of claim 1, wherein if the request is a read request, the method further comprises using a physical address from the object table entry to access the object in main memory.

3. The method of claim 1, wherein performing the corrective action can involve causing a fault handler in the requesting processor to perform the corrective action.

4. The method of claim 1,
    wherein prior to receiving the request at the translator, the request is initially directed to an object cache;
    wherein if the request causes a hit in the object cache, the object is accessed in the object cache and the request is not sent to the translator; and
    wherein if the request causes a miss in the object cache, the request is sent to the translator.

5. The method of claim 4, further comprising making a given object read-only by:
    setting a read-only indicator associated with the given object to indicate that the given object is read-only;
    causing all object caches within a local cache-coherent domain to flush any modified cache lines of the given object out to main memory;
    whereby subsequent upgrades of the given object from read-only status to writable or modified status in any caches within the local cache-coherent domain must go through a translator.

6. The method of claim 5, wherein causing all object caches within the local cache-coherent domain to flush any modified cache lines of the given object out to main memory involves executing a read-with-intent-to-only-read (RWI-TOR) instruction on each cache line of the given object.

7. The method of claim 5, wherein the given object can be made read-only in response to a request received from outside the local cache-coherent domain.

8. The method of claim 1, wherein the translator includes hardware to translate between object identifiers and physical addresses.

9. An apparatus that supports read-only objects within an object-addressed memory hierarchy, comprising:
    a receiving mechanism configured to receive a request at a translator to access an object, wherein the request includes an object identifier for the object that is used to reference the object within the object-addressed memory hierarchy, and wherein the translator converts an object identifier and offset into a corresponding physical address and converts the request to access an object into a request for the corresponding physical address;
    a translation mechanism configured to use the object identifier to retrieve an object table entry associated with the object; and
    a corrective action mechanism, wherein if the request is a write request, the corrective action mechanism is configured to,
        examine a read-only indicator within the object table entry, and
        if the read-only indicator specifies that the object is a read-only object, to perform a corrective action to deal with the fact that the write request is directed to a read-only object, wherein performing the corrective action involves:
            obtaining a writable copy of the object, clearing the read-only indicator to indicate that the object is no longer read-only, and updating the writable copy of the object with data from the write request;
            updating a remotely located master copy of the object with data from the write request;
            terminating the requesting process because the write request is not allowed; and
            if the request is directed to a debugging breakpoint, pausing the requesting process and clearing the read-only indicator.

10. The apparatus of claim 9, wherein if the request is a read request, the translation mechanism is additionally configured to use a physical address from the object table entry to access the object in main memory.

11. The apparatus of claim 9, wherein the corrective action mechanism is configured to cause a fault handler in the requesting processor to perform the corrective action.

12. The apparatus of claim 9, wherein the apparatus includes an object cache;
    wherein prior to receiving the request at the translator, the request is initially directed to the object cache;
    wherein if the request causes a hit in the object cache, the object is accessed in the object cache and the request is not sent to the translator; and wherein if the request causes a miss in the object cache, the request is sent to the translator.

13. The apparatus of claim 12, further comprising a read-only configuration mechanism configured to make a given object read-only by:
  setting a read-only indicator associated with the given object to indicate that the given object is read-only; and
  causing all object caches within a local cache-coherent domain to flush any modified cache lines of the given object out to main memory;
  whereby subsequent upgrades of the given object from read-only status to writable or modified status in any caches within the local cache-coherent domain must go through a translator.

14. The apparatus of claim 13, wherein the read-only configuration mechanism causes all object caches within the local cache-coherent domain to flush any modified cache lines of the given object out to main memory by executing a read-with-intent-to-only-read (RWITOR) instruction on each cache line of the given object.

15. The apparatus of claim 13, wherein the read-only configuration mechanism makes the given object read-only in response to a request received from outside the local cache-coherent domain.

16. The apparatus of claim 9, wherein the translator includes hardware to translate between object identifiers and physical addresses.

17. A computer system that supports read-only objects within an object-addressed memory hierarchy, comprising:
  a processor;
  the object-addressed memory hierarchy;
  an object cache within the object-addressed memory hierarchy;
  a translator that translates between object identifiers, used to address objects in the object cache, and physical addresses, used to address objects in main memory;
  a receiving mechanism within the translator configured to receive at the translator a request to access an object, wherein the request includes an object identifier for the object that is used to reference the object within the object-addressed memory hierarchy, and wherein the translator converts an object identifier and offset into a corresponding physical address and converts the request to access an object into a request for the corresponding physical address;
  a translation mechanism within the translator configured to use the object identifier to retrieve an object table entry associated with the object; and
  a corrective action mechanism, wherein if the request is a write request, the corrective action mechanism is configured to,
    examine a read-only indicator within the object table entry, and
    if the read-only indicator specifies that the object is a read-only object, to perform a corrective action to deal with the fact that the write request is directed to a read-only object, wherein performing the corrective action involves:
      obtaining a writable copy of the object, clearing the read-only indicator to indicate that the object is no longer read-only, and updating the writable copy of the object with data from the write request;
      updating a remotely located master copy of the object with data from the write request;
      terminating the requesting process because the write request is not allowed; and
      if the request is directed to a debugging breakpoint, pausing the requesting process and clearing the read-only indicator.

* * * * *